United States Patent [19]

Harbottle

[11] 4,150,468

[45] Apr. 24, 1979

[54] ADJUSTING PROCESS FOR BEARINGS

[75] Inventor: William E. Harbottle, North Canton, Ohio

[73] Assignee: The Timken Company, Canton, Ohio

[21] Appl. No.: 820,466

[22] Filed: Aug. 1, 1977

Related U.S. Application Data

[62] Division of Ser. No. 628,509, Nov. 3, 1975, Pat. No. 4,054,999.

[51] Int. Cl.$^2$ .......................... B23P 11/00; B21K 1/04
[52] U.S. Cl. .......................... 29/148.4 C; 29/148.4 A; 308/196; 308/236; 33/DIG. 17
[58] Field of Search ...... 33/181 AT, 180 R, DIG. 17, 33/181 R; 29/148.4 A, 148.4 C, 149.5 R; 308/236, 196

[56]  References Cited

U.S. PATENT DOCUMENTS

| | | | |
|---|---|---|---|
| 2,101,130 | 12/1937 | Christman | 29/84 |
| 2,627,120 | 2/1953 | Hotchkiss | 33/181 AT |
| 3,672,019 | 6/1972 | Barnbrook et al. | 29/148.4 A |
| 3,986,754 | 10/1976 | Torrant | 29/148.4 A |

Primary Examiner—C. W. Lanham
Assistant Examiner—V. K. Rising
Attorney, Agent, or Firm—Gravely, Lieder & Woodruff

[57]  ABSTRACT

A shaft is confined within a housing by two indirectly mounted tapered roller bearings, and these bearings are adjusted by applying opposed axial forces to their cups, the spacing between which is dependent on the thickness of a deformable spacer located within the housing. A force of sufficient magnitude is applied to plastically deform the spacer that is between the two cups, and as the force is applied the spacing between the raceways of the two cups is monitored. The force is released when the size of the spacer will cause the cup raceways to be spaced apart a distance which provides the bearings with the correct adjustment. This distance is determined by measuring a master cup and adjusting the dimension so derived for the desired amount of end play or preload and for spring back of the spacer, hub and cups when the load is released. The process may be used where the cones are press-fitted over the shaft and have their front faces abutting. In that case, further adjustments from the raceway spacing of the master may be made to accommodate changes in the positioning of the cone raceways which result from variations in the cone bore diameters and in the locations of the cone front faces. The measurement of the cone bore diameters and front face locations are made in a fixture and compared with measurements derived from master cones which are also measured in the fixture, all for the purpose of determining deviations from the master cones.

23 Claims, 9 Drawing Figures

ADJUSTING PROCESS FOR BEARINGS

This is a division of application Ser. No. 628,509, filed Nov. 3, 1975, now U.S. Pat. No. 4,054,999.

BACKGROUND OF THE INVENTION

This invention relates to tapered roller bearings and more particularly to a method of adjusting tapered roller bearings with considerable precision.

Tapered roller bearings have the capability of carrying high radial loads as well as thrust loads, and furthermore when they are utilized in pairs, one bearing may be adjusted against the other to obtain the desired amount of end and radial play. For these reasons tapered roller bearings arranged in pairs are utilized almost universally in the nondriven wheels of automobiles manufactured in the United States. Normally, the non-driven wheels are the front wheels.

In the typical front wheel mounting (see FIG. 1), the wheel is bolted to a hub which in turn is mounted on a spindle by a pair of tapered roller bearings. The cups of the bearing are pressed through the bores within the hub until the cup back faces come against the shoulders. The cone assemblies, that is, the cones with the rollers and cages surrounding them, fit loosely over the spindle. The back face of the inboard cone bears against a cone backing shoulder on the spindle, while the back face of the outboard cone is located by a nut which threads over the end of the spindle. The nut affords the adjustment, and it should be run up until the bearing mounting is between 0.001 and 0.008 inches end play, a range of 0.007 inches.

On present automotive assembly lines, the bearing adjustment is a manual operation which on occasion does not receive the skill and care it demands. As a result, some bearings could be released with too much preload, while others could be set with too much end play. Either may be corrected by the dealer, but such corrections are a nuisance and increase the cost of maintaining warranties.

Because of the large number of dimensions which affect the bearing adjustment for a non-driven wheel, it has been impractical to maintain each of the dimensions within acceptable tolerances so that the overall tolerance in the bearing assembly falls within the acceptable service range, that is, 0.001 to 0.008 inches end play. In this regard, each of the following dimensions, or more specifically the tolerances allowed for those dimensions, affects the bearing adjustment, that is, those tolerances determine the position to which the spindle nut must be advanced to provide the proper bearing adjustment:

1. The axial dimension a between the backing shoulders of the hub,
2. The cup back face location $b_1$ and $b_2$ for the inboard and outboard bearings, respectively each of which is basically the distance between a known working diameter along the cup raceway and the cup back face when the cup is not stressed (out of its hub bore),
3. The cone back face locations $c_1$ and $c_2$ for the two bearings each of which is basically the distance from the known working diameter on the outer tapered surface of the rollers and the cone back face.
4. The cup diameters $d_1$ and $d_2$ for the two cups (when the cups are pressed into the bores of the hub, they shrink and this reduces the raceways thereof, causing the cones to project further beyond the cups), and
5. The hub bore diameters $e_1$ and $e_2$ for receiving the two cups. From the foregoing, it is apparent that the adjusting nut on the spindle compensates for nine tolerances.

The nine tolerances result in an overall tolerance range of 0.040 inches in the typical bearing assembly. However, according to the laws of probability, when parts are selected randomly, not all parts will have tolerances at the high side or the low side, but on the contrary the parts will constitute a mixture of high and low tolerances. Because of the variation in tolerances, the axial dimension of a substantial number of the assembled bearings will fall generally midway between the extremes of the overall tolerance range, and this establishes a mean axial dimension. Even so a substantial number of the bearing assemblies will deviate from the mean axial dimension and by a relatively large amount. More specifically, the laws of probability tell us that when standard tolerances are held in the nine dimensions previously discussed, 68.26% of the bearing assemblies will fall within a range of 0.006 inches, 95.46% will fall within a range of 0.012 inches, and 99.73% will fall within a range of 0.018 inches. All but the first of these ranges are outside the acceptable service range of a tapered roller bearing assembly for automotive applications, which is 0.007 inches.

Of course, the overall tolerance range within the bearing assembly may be reduced by decreasing the nine individual tolerances which contribute to the overall tolerance. This, however, is extremely expensive.

Thus, from the foregoing, it is apparent that under current techniques, the only practical device for accommodating the large overall tolerance in a bearing assembly is the adjusting nut, even though the adjustment afforded by such a nut is dependent on the judgment of the operator who installs it.

Tapered roller bearings are also employed in mounting for the front wheels of front wheel drive automobiles. In these applications even more tolerances are involved and the adjustment required for satisfactory performance is quite critical. In particular, the two bearings are normally set quite close together so that the universal joint may be located as close to the steering knuckle pivot axis as possible. This enables the universal joint to transmit torque as smoothly as possible. Due to the relatively small spread between the bearings, end play within the bearing assembly produces considerably more wheel wobble. Stated differently, as the bearing spread decreases, tire wobble increases for any given amount of end play. Consequently, the bearing adjustment is quite critical. To increase the rigidity of such mountings as much as possible, the cones of the two bearings are usually press-fitted over a hub sleeve to which the drive shaft is splined. Also, press-fitted cones are desirable for applications having rotating cones. Hence, tolerances of the two cone bores as well as the tolerance of the hub sleeve also affect the overall tolerance of the bearing assembly and indeed increase the overall tolerance range.

SUMMARY OF THE INVENTION

One of the principal objects of the present invention is to provide a process of adjusting a bearing assembly with considerable precision. Another object is to provide a process of the type stated which enables a bearing assembly to be adjusted without relying on the judgment of the individual performing the assembly operation. A further object is to provide a process of the type stated which enables a bearing assembly to be installed on a suitable mounting with the proper adjustment merely by running a nut up tightly against a shoulder or some other backing surface. An additional object is to provide a process which enables bearing assemblies to be sold, shipped and mounted in a pre-set, pre-lubricated, and pre-sealed condition. Still another object is to provide a process for assembling bearings of driven wheels, which bearings have their inner races pressed over a sleeve or shaft. These and other objects and advantages will become apparent hereinafter.

The invention is embodied in a process for adjusting a bearing by deforming a spacer which positions races of the bearing. More specifically, a spacer is placed between the races of a bearing, the space between the races is measured, and a force of sufficient magnitude is applied until the spacer is deformed to a size which provides the bearing with correct adjustment. The invention also consists in the parts and in the arrangements and combinations of parts hereinafter described and claimed.

DESCRIPTION OF THE DRAWINGS

In the accompanying drawings which form parts of the specification and wherein like numerals and letters refer to like parts wherever they occur.

DETAILED DESCRIPTION

Non-Driven Front Wheels

Figure 1:
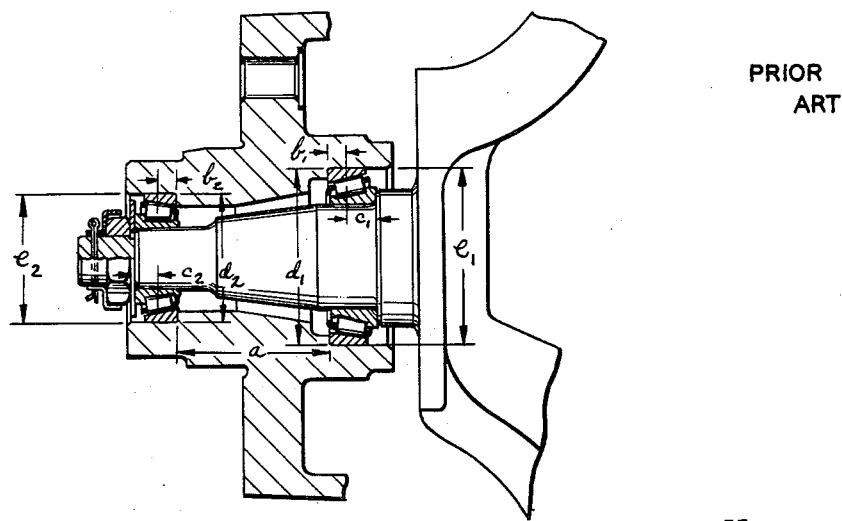
FIG. 1 is a sectional view of a conventional front wheel bearing assembly (prior art) which is adjusted by means of a nut threaded over a spindle.

Referring now to the drawings, a front wheel mounting M (FIG. 2) of the non-driven variety includes a steering knuckel K on which a wheel hub H is mounted by means of a pair of tapered roller bearings B1 and B2. The inboard bearing B1 and the outboard bearing B2, although different in size, are conventional tapered roller bearings and as such each includes four basic components, namely, a cup 2, a cone 4, tapered rollers 6, and a cage 8.

Figure 3:
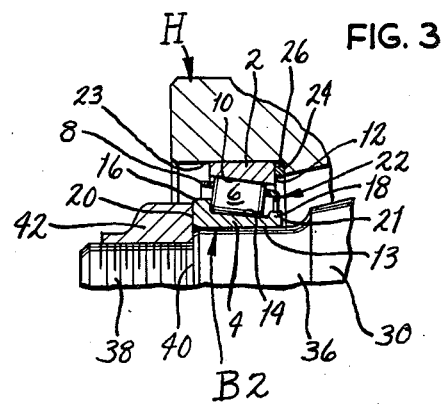
FIG. 3 is a fragmentary enlarged view of the spacer and adjacent bearing shown in FIG. 2.

The cup 2 (FIG. 3) has an inwardly presented tapered raceway 10, and a back face 12 at the large diameter end of the raceway 10. The cone 4 (FIG. 3) has a central bore 13, an outwardly presented tapered raceway 14, a thrust rib 16 at the large diameter end of the raceway 14, and a retaining rib 18 at the small diameter end. The cone 4 is also provided with a back face 20 located on its thrust rib 16 and a front face 21 on the retaining rib 18. The cone 4 is positioned within the cup 2 such that the cone raceway 14 is located opposite and concentric to the cup raceway 10, and the tapered rollers 6 are interposed between the two raceways 10 and 14 with the large diameter ends of the rollers 6 against the thrust rub 16. The geometry of each bearing B1 and B2 is such that when the bearing is loaded, its tapered rollers 6 are more or less squeezed or urged in the direction of the thrust rib 16 which prevents the rollers 6 from being completely expelled from the space between the raceways 10 and 14. The cage 8 maintains the proper circumferential spacing between the rollers 6 and further keeps the rollers 6 from dropping away from the cone raceway 14 when the cone 4 is removed from the cup 2. The retaining rib 18 keeps the rollers and cage from sliding off of the small diameter end of the cone raceway 14. Thus, the cone 4, the rollers 6 and the cage 8 are all held together as a unit which is called a cone assembly 22, and this unit or cone assembly 22 remains intact even when the cone 4 is withdrawn from the cup 2.

Figure 2:
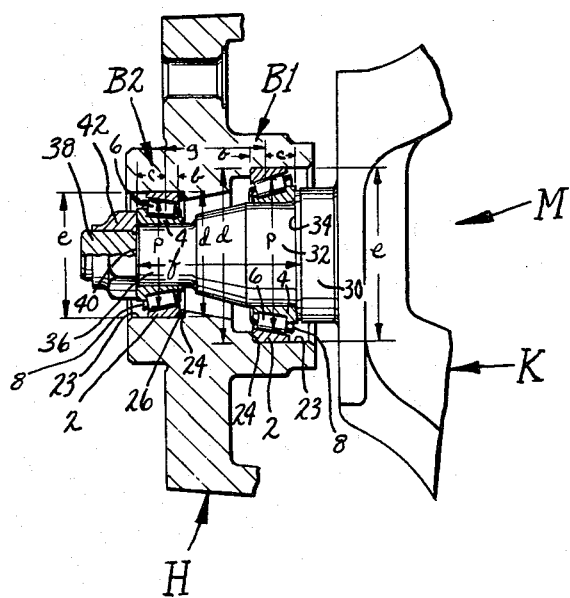
FIG. 2 is a sectional view of a front wheel mounting, the bearings of which are adjusted in accordance with the processes of the present invention.

Several dimensions within the bearing B are important in determining the overall spread occupied by the bearings B1 and B2, that is, the distance between the back faces 20 of the two cones 4 (FIG. 2). The first is the cup back face location b which is the axial distance between a working diameter p along the cup raceway 10 to the cup end face 12 when the cup 2 is unstressed (neither expanded nor contracted). Another is the cone back face location which is the dictance c from the working diameter p of the cone assembly 22 (cone plus rollers and cage) to the cone back face 20 when the cone is unstressed and the rollers 6 are seated against the tapered raceways 10 and 14 and the thrust rib 16. Also, important is the cup outside diameter d, since when the cup 2 is contracted by a press-fit, the cup raceway 10 shrinks and the cup back face location b is in effect lengthened. The increase in length is, of course, dependent on the angle of the cup raceway 10 and can be determined by multiplying the reduction in diameter by a suitable conversion factor (k) for the particular bearing.

The wheel hub H (FIG. 2) has a hollow interior with end bores 23 at each end, and these bores inwardly terminate at cup backing shoulders 24. The diameters e of bores 23 are slightly less than the outside diameters d of the corresponding cups 2, and the cups 2 are pressed into the bores 23. More specifically, the inboard cup 2 is pressed through the inboard end bore 23 to a position in which its back face 10 is against the shoulder 24. The outboard cup 2 is likewise pressed into outboard end bore 23, but a deformable spacer 26 is interposed between the back face of the cup 2 and the nearby shoulder 24. The spacer 26 is deformable in the sense that its yield strength is below that of the cup 2 for the bearing B2 and also below that of the hub H. Thus, the spacer 26 may be deformed by applying an axial force to the outboard cup 2 and resisting that force at the shoulder 24.

The steering knuckle K includes a horizontal spindle 30 which projects through the hub H and the bearings B1 and B2 therein. The spindle 30 has a large diameter cylindrical surface 32 over which the cone 4 of the inboard bearing B1 fits and that surface terminates at a cone backing shoulder 34 against which the cone back face 20 of the bearing B1 abuts. A loose fit exists between the bore of the cone 4 and the surface 32 so that the cone 4 slides easily over it. Near its other end, the spindle 30 has another cylindrical surface 36 which is smaller in diameter than the surface 32. The cone 4 for the outboard bearing fits over the surface 36, with the fit again being loose. Beyond the surface 36 the spindle 30 has a threaded end portion 38, and the end portion 38 and cylindrical surface 36 are separated by a shoulder 40. Threaded over the end portion 38 is a nut 42 which is run up against the shoulder 40 and also the back face 20 of the outboard cone 4. Thus, the nut 42 positions the back face 20 of the outboard cone 4 precisely at the shoulder 40. The nut 42 is of the torque prevailing or self-locking variety and hence requires more torque to loosen than to apply.

The axial dimension f between the two shoulders 34 and 40 on the spindle 30 is one of the dimensions which controls the adjustment of the overall bearing assembly and hence this dimension is held within close tolerance on the order of 0.002 inches. In contrast to conventional bearing assemblies for non-driven wheels, the nut 42 is not used for adjustment purposes. Since it is merely run up against the shoulder 40, the nut 42 is applied routinely and with the exercise of little judgment.

The adjustment of the bearings B1 and B2 in the mounting M is controlled at the spacer 26 located behind the cup 2 of the bearing B2, the adjustment being achieved by deforming the spacer 26 until the spacing between the cups 2 provides the bearings B1 and B2 with the correct adjustment. Thus, the spacer 26 when not deformed should be of such thickness as to provide every mounting M in which it may be installed with too much preload. Actually, the critical dimension which is controlled by the spacer 26 is the cup raceway to raceway location g. That dimension is defined more precisely as the axial distance from the selected working diameter p on the tapered raceway 10 for the outboard cup 2 to a selected working diameter p on the tapered raceway 10 for the inboard cup 2. The selected diameter p does not vary when comparing the cup raceway to raceway location g of the mounting M with that of another mounting M.

A cup pressing fixture S (FIGS. 4 and 5) installs the cups 2 in the end bores 23 of the hub H and further deforms the spacer 26 until the correct cup raceway to raceway location g exists within the hub H. The fixture S includes a base 50 having a jig 52 which positions the hub H thereon with the small or outboard end bore 23 presented upwardly. Within the base is a slide 54 which holds the large inboard cup 2, and is capable of moving between outer and inner positions. The inboard cup 2 is loaded into the slide 54 when the slide 54 is in its outer position and thereafter the slide 54 is moved to its inner position (FIG. 4) wherein the cup 2 is directly below the hub H and aligned with the lower end bore 23 therein.

The fixture S also includes a lower ram 56 which is supported on the base 50 and is hydraulically actuated. The ram 56 is in part hollow and its upper end is of an annular configuration, being sized to fit against the front face of the inboard cup 2. That face is presented downwardly in the fixture S since the back face 12 must be brought against the shoulder 24 in the hub H. Within the hollow interior of the ram 56 is a tapered plug 58, and the taper of this plug is precisely that of the cup 2. The plug 58 is supported on biasing springs 59 which urge it upwardly within the interior of the ram 56. The tapered plug 58 in turn carries a measuring probe 60 which is spring loaded and is capable of distinguishing dimensional variations in axial direction as small as one-ten thousandth inch. Linear Voltage Displacement Transducers (LVDT) are suitable for this purpose.

Above the base 50 is a hydraulically operated upper ram 64, and this ram axially aligns with and moves toward the lower ram 56. The ram 64 has a hollow interior which contains a tapered plug 66, and the taper of this plug precisely matches the taper of the raceway for outboard cup 2 which is presented upwardly. The plug 66 is movable independently of the ram 64 and is urged downwardly by biasing spring 68. It further has a flat downwardly presented surface.

The hydraulic rams 56 and 64 are controlled by a computer (not shown), and the readings derived from the measuring probe 60 are fed into the computer.

Before the fixture S is utilized to install the cups 2, it is first calibrated. In this regard, all measurements which are made in the adjustment process are computed as deviations from a standard or master. For example, a master hub (not illustrated) containing master cups exist as do master cone assemblies (not illustrated). The masters are made precisely to the nominal dimensions for the parts, that is tolerances for all intents and purposes do not exist in those dimensions. Thus, when the master hub, cone assemblies and a master spindle are assembled, the resulting bearing mounting will have the desired amount of end play which may be 0.003 inches. The fixture S is calibrated with the master hub.

Figure 5:
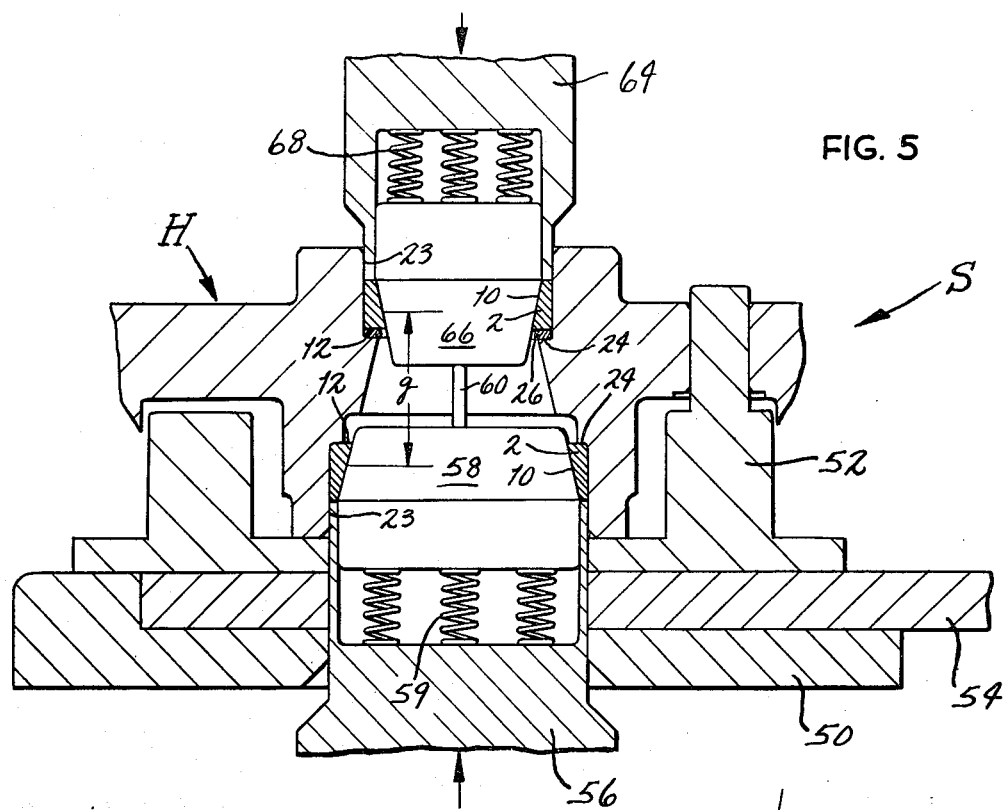
FIG. 5 is a sectional view of the cup pressing fixture, but showing the cups pressed into the bores of the hub and the tapered plugs fitted into the cups to measure the cup raceway to raceway location.

In particular, the master hub is placed on the jig 52 and then the rams 56 and 64 are moved together to bring the spring loaded plugs 58 and 66 into contact with the raceways 10 of the cups 2 within the master hub H (not illustrated, but similar to FIG. 5). The upper ram 64 precedes the lower ram 56 insofar as contact with the master cups 2 is concerned so that the lower ram 56 will not lift the master hub H off of the jig 52. As the plugs 58 and 66 come together the measuring probe 60 contacts the end face of the upper plug 66 and is moved into the lower plug 58. The position assumed by the probe 60 when the two plugs 58 and 60 are located by their cup raceways 10, is retained in the memory of the computer and represents the standard or desired cup raceway to raceway location g. Actually, the probe 60 provides a reading in inches which may or may not be an actual dimension within the master hub H. The importance of the reading is in the fact that it establishes a standard value or reference to which all other hubs H are compared.

Figure 4:
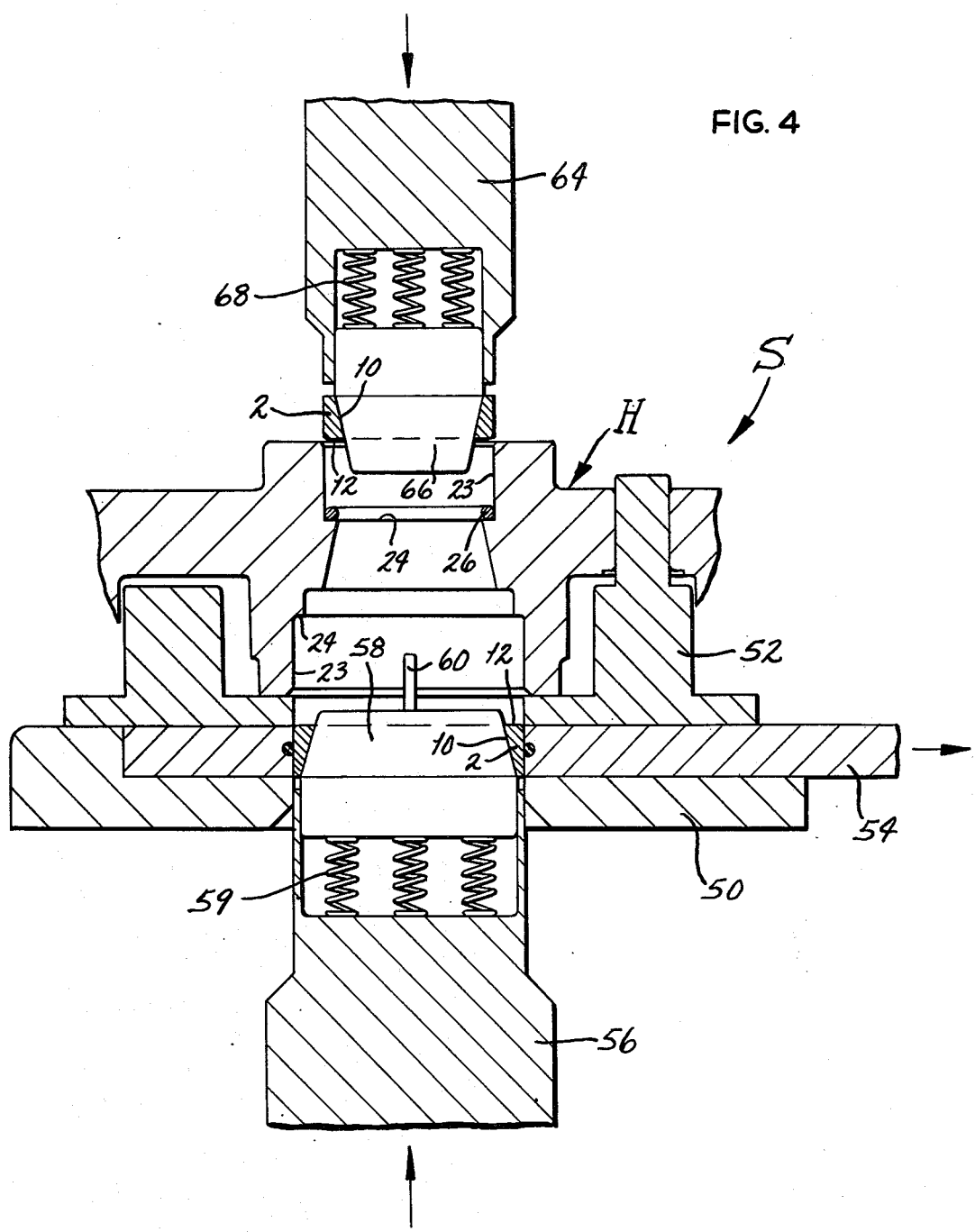
FIG. 4 is a sectional view of a cup pressing fixture used in the process and showing a wheel hub positioned on the fixture with the cups of the bearing aligned with the bores in the hub.

After the fixture S is calibrated by establishing a standard reading for the probe 60, a hub H without any cups 2 in it is placed on the jig with its outboard end presented upwardly (FIG. 4). With the slide 54 in its outer position, the cup 2 for the inboard bearing B2 is placed in the slide 54 with its back face 12 presented upwardly and its tapered raceway 10 opening downwardly. The slide 54 is then moved to its inner position, in which case the cup 2 therein will be located between the lower ram 56 and the inboard end bore 23 in the hub H. The spacer 26 in its initial condition, that is, without being deformed, is then placed in the outboard end bore 23 and allowed to rest on the shoulder 24 at the inner end of that bore 23. Next, the outboard cup 2 is placed over the end of the bore 23 and allowed to rest on the hub H with its back face 12 presented downwardly toward the spacer 26. Since the bore 23 is slightly smaller than the outside diameter of the cup 2, the cup 2 does not slide into the bore 23.

Once the spacer 26 is in place and the two cups 2 are properly aligned with their respective end bores 23 in the hub H, the rams 56 and 64 are energized by directing hydraulic fluid to them. Again, the upper ram 64 precedes the lower ram 56 so that the lower ram 56 does not lift the hub H off of its jig 52. As the rams 56 and 64 advance toward one another, the plugs 58 and 66 carried thereby seat against cup raceways 10 with the force of the spring load by which they are backed. Continued advancement of the rams 56 and 64 brings the annular ends thereof into contact with the front faces of the cups 2 and the cups 2 are forced through the bores 23 (FIG. 5). In time, the back face 12 of the inboard cup 2 will come against the lower of the two backing shoulders 24, while the back face 12 of the outboard cup 2 will come against the spacer 26. At this time, the force applied by the rams 56 and 64 increases significantly indeed it increases to a magnitude sufficient to cause the spacer 26 to yield, which it does.

As the spacer 26 yields the plugs 58 and 66 move toward each other with the spacing between them being monitored by the probe 60. Actually, the probe 60 provides the computer with a reading which is compared with the standard reading derived from the master hub. At the same time, the computer monitors the compressive force applied to the spacer 26 by the rams 56 and 64.

In addition to the standard or reference reading of the probe 60 derived from the master hub H, the computer memory also contains the deflection characteristics of the spacer hub-cup assembly. For example, it will know that at 20,000 lbs. force the parts through which the force acts will spring back 0.001 inches, at 30,000 lbs. it will spring back 0.0015 inches, at 40,000 lbs. it will spring back 0.002 inches, etc. Thus, as the outoard or upper cup 2 continues to advance, reducing the axial dimension of the spacer 26 as it does, that cup 2 will eventually reach a position in which the reading derived from the probe 60 is the same as that for the master hub, indicating that cup raceway to raceway location g is at the desired value. However, this condition exists with the spacer 26 under considerable load, and if the load were released the spacer 26, hub H and cups 2 would spring back and increase the cup raceway to raceway location g. The computer, however, knows the amount of spring back for any given load since that information was placed in its memory, so the computer continues to advance the outboard cup 2, comparing the deviation from the standard reading with the load. When the deviation reaches a value which corresponds to the spring back for the load applied, the computer immediately releases the hydraulic pressure to the rams 56 and 64. For example, if the probe reading derived from the master hub is 1.0000 inches when the two plugs 58 and 66 were seated in their respective raceways 10, and the deflection characteristics of the spacer, hub and cups are such that they will spring back 0.004 inches upon the release of a 50,000 lb. load, then the computer will release the hydraulic loading if the feedback from the hydraulic system indicates a 50,000 lb. load exists and the probe 60 measures 0.996 inches (1.000-0.004). Of course, as the load increases so does the spring back so the computer must consider several variables at the same time.

In any event, the spacer 26 is compressed under load to a position in which the reading derived from the probe 60 is less than that for the master hub H so that when the load is released the spring back will move the outboard cup 2 outward slightly.

The cup pressing fixture S enables the cups 2 to be installed within the hub H such that the cup raceway to raceway location g is within 0.001 of an inch of its desired dimension. In so doing, it cancels out the tolerances in the following dimensions, which tolerances are normally accommodated by an adjusting nut in a conventional bearing set up (FIG. 2):

1. two cup back face locations b,
2. two cup outside diameters d,
3. two hub bores e, and
4. spacing between cup backing shoulders 24.

In effect, the process substitutes a single relatively small tolerance for seven tolerances, many of which are quite large and difficult to hold in machining operations. This is particularly true of the last dimension, that is, the spacing between the cup backing shoulders 24.

Once the cups 2 are installed within the hub H in accordance with the foregoing procedure, the entire mounting is assembled, that is, the inboard cone assembly 22 is placed over the spindle 30 and against the backing shoulder 24, then the hub H is moved over the spindle 30 followed by the outboard cone assembly 22. Then the nut 42 is threaded over the end portion 38 and run up against the shoulder 40. Since the shoulder 40 locates the nut 42, no adjustment by feel is required.

It is known that a tapered roller bearing for non-driven wheels will operate satisfactory--within a range of 0.0015 inches preload to 0.0050 inches end play which is a total range of 0.0065 inches. Therefore, when the wheel mounting M is assembled in accordance with the foregoing procedure, the remaining tolerances should not be so great as to cause the mounting M to be out of this range. Those remaining tolerances are in the following dimensions:

1. two cone back face locations c
2. the spacing f between the shoulders 34 and 40 on the spindle 30
3. the cup raceway to raceway locations g.

Thus, four tolerances remain after the assembly of the mounting M in accordance with the foregoing procedure, and these tolerances may when added together exceed the permissible range for adjustment. However, according to the laws of probability, the chances of obtaining all large or all small parts are very minimal. Indeed, the foregoing tolerances can be held such that 99.73% of all the bearing assemblies will be within the permissible range. This percentage of acceptable bearing assemblies exceeds that derived from conventional hand adjustment procedures currently being employed on automotive assembly lines. The laws of probability as applied to bearing assemblies are discussed in a Publication of The Timken Company of Canton, Ohio, that publication being Engineering Bulletin No. 6, dated 1963 and entitled Manual Bearing Setup Eliminated Through Probability 99.73% Reliable.

The front wheel mounting M furthermore retains the same adjustment after being disassembled and reassembled in the field for maintenance purposes. For example, a garage mechanic who replaces brake linings or pads or repacks the grease in the bearings B1 and B2 will not alter the adjustment of the bearings B1 and B2 when he reassembles the mounting M, assuming of course that the cups 2 are not removed and the same cone assemblies 22 are employed. Indeed, while the replacement of the cone assemblies 22 will no doubt alter the adjustment, the adjustment will still be within the permissible range since the cone assemblies 22 are manufactured to prescribed tolerances.

The close tolerances enable the bearings B1 and B2 to be located closer together without sacrificing rigidity.

DRIVEN FRONT WHEELS

Figure 6:
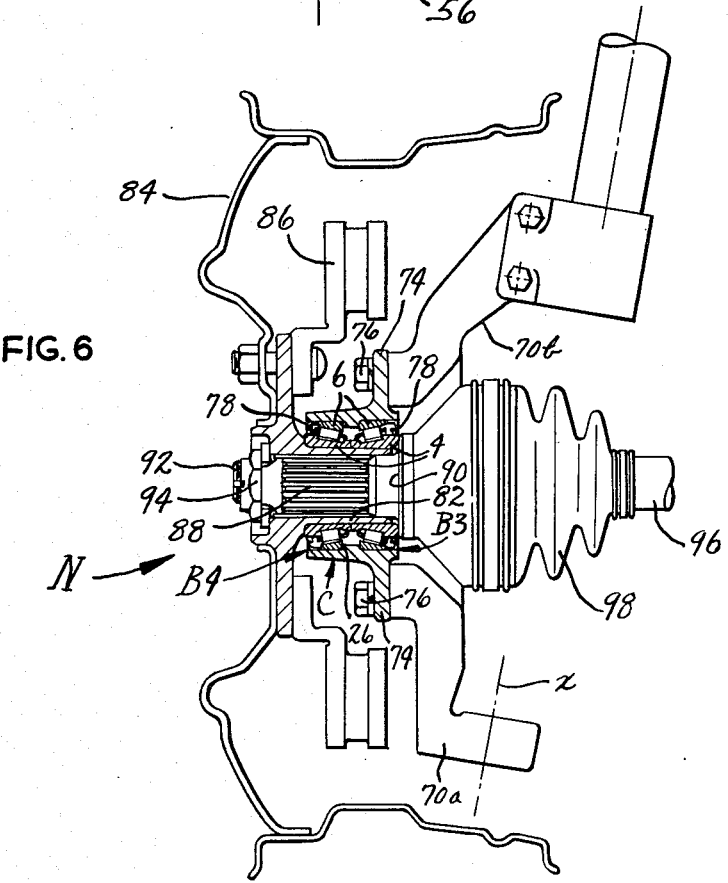
FIG. 6 is a sectional view of a driven wheel mounting adjusted in accordance with the process of the present invention.

The process and equipment heretofore described may in a more sophisticated embodiment be used to adjust the mounting N (FIG. 6) for a driven wheel of the independently sprung variety. Such wheels are usually at the front.

The mounting N includes a spindle bracket 70a having a ball at its lower end which is received in a socket carried by the "A" frame of the vehicle and a bracket 70b at the upper end which is bolted to a McPherson strut. Alternatively, the brackets 70a and 70b each have balls which are received by sockets carried by the upper and lower "A" frames of a vehicle. The brackets 70a and 70b carry a bearing housing or cup carrier C which has a flange 74 through which bolts 76 extend for securing the carrier C to the brackets 70a and 70b. Otherwise, the carrier C is similar to the hub H, and it contains end bores 23 and cup backing shoulders 24.

The cup carrier C (FIG. 6) houses bearings B3 and B4 which are very similar to the bearings B1 and B2. However, both bearings B3 and B4 are the same size. Moreover, the cones 4 are provided with extended thrust ribs 16 (FIGS. 7) and retaining ribs 18. The two retaining ribs 18 abut at their front faces 21, while the outwardly presented cylindrical surfaces of the thrust ribs 16 form sealing surfaces against which seal rings 78 bear. The seal rings 78 are press-fitted into the end bores 23 outwardly from the cups 2 therein. A deformable spacer 26 (FIG. 7) is located between one of the cup backing shoulders 24 and the back face 12 of the cup 2 which is pressed into the bore 23 leading up to that shoulder 24.

The cones 4 of the two bearings B3 and B4 have a drive flange 82 (FIG. 6) extended through them, and this drive flange is slightly greater in diameter than the bore 13 of the cones 4 so that an interference fit exists between the cones 4 and the drive flange 82. As a result, the cones expand slightly when the drive flange 82 is pressed through them. At its outer end, the drive flange 82 has a wheel 84 and a brake disk 86 bolted to it. The drive flange 82 abuts against the back face 20 of the outboard cone 4.

The drive flange 82 is hollow and receives a short drive spindle 88 having a cone backing shoulder 90 at its inner end and threads 92 at its outer end. Both the drive flange 82 and the drive spindle 88 are splined so that they are locked together for rotation in unison. The cone backing shoulder 90 abuts against the back face 20 on the inboard cone, while a nut 94 is run up over the threads 92 so that it is tightly against the outwardly presented end face on the drive flange 82. As a result, the two cones 4 and the drive flange 82 are clamped tightly together between the cone backing shoulder 90 and the nut 94.

The drive spindle 88 is connected to a drive shaft 96 through a Rzeppa type universal joint 98. Thus, when the drive shaft 96 rotates so does the drive spindle 88. Since the drive flange 82 is splined to the drive spindle 88, the drive flange 82 likewise rotates as do the wheel 84 and brake disk 86 which are attached thereto. The cones 4, being pressed over the drive flange 82 also rotate, but the cups 2 remain stationary in the cup carrier C.

The sole purpose of the nut 94 is to hold the wheel mounting N together. It has no affect on the adjustment of the bearings B3 and B4. On the contrary, the adjustment is dictated by the thickness of the spacer 26.

Initially, the spacer 26 (FIG. 7) is thick enough to place the bearings B3 and B4 under severe preload. However, before the mounting N is assembled, the spacer 26 is crushed to a dimension which provides the mounting N with the correct adjustment. When correctly adjusted and completely assembled, the mounting N is in a condition of end play preferably having a magnitude of 0.001 inches. This is termed the mounted end play.

The spacer 26 upon being crushed accommodates tolerances in the following dimensions, all of which affect the mounted end play (FIG. 7):

1. the back face locations b of the two cups 2,
2. the outside diameters d of the two cups 2,
3. the diameters e of the two end bores 23,
4. the front face locations h of the two cones which is the axial distance between the front face of each cone 4 and the working diameter p of its cone assembly 22, and
5. the diameters i of the bores 13 of the cones 4.

Figure 9:
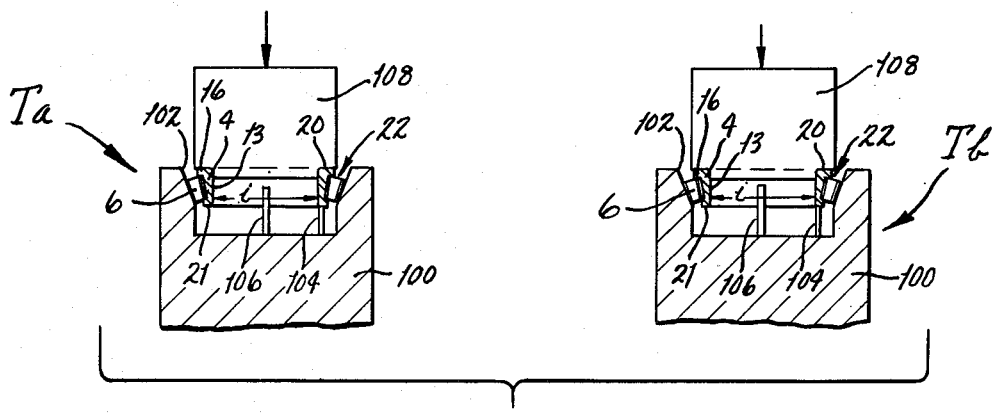
FIG. 9 is a sectional view of cone measuring fixtures used to adjust the bearing mounting of FIG. 7.

The spacer 26 is crushed to the proper axial dimension in the cup pressing fixture S (FIGS. 4 and 5) contemporaneously with the installation of the cups 2 in the end bores 23 of the cup carrier C. In this regard, the jig 52 of the fixture S is modified to properly align the end bores 23 of the cup carrier C with the rams 56 and 64. The cup pressing fixture S is employed with two cone measuring fixtures Ta and Tb (FIG. 9). Both the fixtures T and the cup pressing fixture S feed information into and are controlled by a computer in the manner subsequently described.

Each cone measuring fixture T (FIG. 9) includes a pedestal 100 having a work cup 102 therein with the large diameter end of the tapered raceway on the work cup 102 being presently upwardly. The taper of the raceway for the work cup 102 corresponds precisely to the design or nominal taper for the raceways 10 of the cups 2 for the bearings B3 and B4. In other words, the work cup 102 is in effect a master cup or gauge, at least insofar as its taper is concerned. Since the work cup 102 opens upwardly, it readily receives one of the cone assemblies 22, that is, a cone 4 having the rollers 6 and cage 8 surrounding it. When the cone assembly 22 is in the pedestal 100, the back face 20 of the cone 4 is presented upwardly.

The pedestal 100 contains two measuring devices, namely, an axial location probe 104 and a bore probe 106. The axial location probe 104 may be an LVTD and it moves in the axial direction and aligns with the front face 21 of the cone 4 so as to abut against that face. The bore probe 106 is disposed centrally with respect to the work cup 102, and it projects upwardly into the bore 13 of the cone 4 to measure the diameter i of the same. It may be an air gauge, in which case it ejects a jet of air radially against the cone bore 13 and measures the back pressure. It may also be a LVTD. In any event, both the axial location probe 104 and the bore probe 106 are connected with the computer and feed the measurements they make to the computer.

Aside from the pedestal 100, each cone measuring fixture T also includes a cone loading ram 108 which aligns with the work cup 102 and moves toward and away from it. The ram 108 rotates. Hence, when it is brought against the back face 20 of the cone 4 in the work cup 102, the cone assembly 22 will be loaded in thrust and will further rotate within the work cup 102. This causes the rollers 6 to seat against cone raceway 14 and the raceway of the work cup 102 and also against the thrust rib 16, as would be the case if the bearings B3 or B4 were in operation. The ram 108 is hydraulically powered and is controlled by the computer.

A set up procedure must be completed before the equipment is capable of pressing the cups 2 into the end bores 23 of the cup carrier C. That set up procedure involves calibrating the measuring devices associated with the probes 60, 104 and 106, and further providing the computer with sufficient information to enable it to make its calculations.

Insofar as calibration is concerned, two master cones 110a and 110b (FIG. 8) are employed along with a master cup 112. The cones 110 are actually rings having a tapered outside surface which corresponded in size precisely to the nominal dimensions of cone assemblies 22. Moreover, when the cones 110a and 110b are fitted into the master cup 112, the tapered surfaces on the master cones 110 and the cup 112 are in face to face contact as are the opposed front faces of the two cones 112. In other words, when the master cones 110a and 110b are loaded into the master cup 112 a condition of zero end play and zero preload is simulated. The clearance between the front faces of the two cones 110a and 110b is zero, and the so-called "cup carrier location" is said to be zero. The cup carrier location does not constitute any specific dimension within the mounting N, but is a point of reference from which deviations may be measured. Nevertheless, it is closely related to the cup raceway to raceway location g and decreases in a one-to-one ratio with that dimension as will subsequently be apparent. The bores 13 of the master cones 110 are perfectly round and of known diameter.

The master cup 112 is placed in the cup pressing fixture S, and the rams 56 and 64 of that fixture S are energized to bring the tapered plugs 58 and 66 into contact with the tapered surfaces of the master cup 112. The reading derived from the probe 60 establishes a reference for the cup carrier location and is stored in the memory of the computer as a cup carrier location of 0.0000 inches.

The master cone 110a is loaded into the work cup 102 of the cone measuring fixture Ta and the readings derived from the two probes 104 and 106 are introduced into the memory of the computer as the standard or reference for the cone front face location h and the cone bore i for the cone assembly 22 of the bearing B3.

The other master cone 110b is loaded into the other cone measuring fixture Tb in a similar manner and the readings derived from the probes 104 and 106 thereof constitute the standard or reference for cone front face location h and the cone bore i for the cone assembly 22 of the other bearing B4. These standards are stored in the memory of the computer.

When an air gauge is used for the bore probes 106, another tapered ring having a bore of known size which is different from the bores of the master cones 110a and 110b is placed in the work cups 102 of the two fixtures Ta and Tb so that the computer is provided with two reference points for establishing a slope which enables it to determine dimensions corresponding to pressure anywhere along the slope. The LVTD's are precalibrated in the sense that two reference points are not needed for their successful operation.

Other information which is introduced into the computer includes a conversion factor k by which radial deviations from the standard are converted into axial dimensions which affect end play. For example, if the cones 4 are expanded, by reason of the press-fit over the drive flange 82, any end play in the bearings B3 and B4 will be decreased. Also, a dimension known as the desired end play is introduced into the computer. That dimension is derived from the nominal or design dimensions of the mounting N and represents the end play the bearings B3 and B4 should have when the cones 4 are unstressed, that is, when the drive flange 82 is removed from them. This dimension differs from the mounted end play dimension in that the latter is the end play in the mounting N when the cones 4 are press-fitted over the drive flange 82. The desired end play for the bearing mounting N is determined in advance according to the following formula:

$$\text{desired end play} = \text{mounted end play} + k(\text{nominal shaft diameter-cone bore B3}) + k(\text{nominal shaft diameter-cone bore B4})$$

The nominal shaft and cone bore dimensions are the design dimensions, that is, the specified dimensions considered without tolerances. The foregoing represents the more important constants introduced into the computer, although it does not represent the totality of information. Other constants which are introduced into the computer set dimensional limits on various operations so that a part will be rejected if it exceeds the limits. They also provide running times for the equipment, and the like.

Once the computer is provided with the various standards or references for the cup carrier location reading of the probe 60, for the front face location h of the cone readings of the probes 106, and for the cone bore readings of the probes 108, the fixtures S and T are loaded with the various components of the bearings B3 and B4. In particular, the cone assembly 22 for the bearing B3 is loaded into the work cup 102 of the fixture Ta (FIG. 9) such that the tapered rollers 6 are against the raceway of the work cup 102, and the back face 20 of the cone 4 is presented upwardly. The cone assembly 22 for the bearing B4 is loaded into the fixture Tb in a similar manner (FIG. 9). Also, the cup carrier C is placed on the jig 52 (FIG. 4) of the cup pressing fixture S, and the spacer ring 26 is inserted into the upwardly opening end bore 23. One of the cups 2 is placed over that end bore 23 with its back face 12 presented downwardly. The other cup 2 is installed in the slide 54 with its back face 12 presented upwardly, and the slide 54 is moved inwardly to align the cup 2 with the lower end bore 23.

Thereafter, an actuating switch is closed, and that switch causes the computer to commence measuring the bearing components and utilizing the measurements so derived to position the cups 2 such that when the wheel mounting N is assembled the correct mounted end play will exist.

Insofar as the cone measuring fixtures T (FIG. 9) are concerned, the loading ram 108 of each descends against the back face 20 of the cone 4 therein and applies a load to the cone 4. The ram 108 commences to rotate after engaging the back face 20 of the cone 4, and this causes the rollers 6 to seat against the tapered raceway 14 of the cone 4 and against the tapered raceway of the work cup 102. Indeed, the rollers 6 ride up the cone raceway 14 so that their large diameter end faces seat against the thrust rib 16. After about one second of rotation, the axial location probe 104 measures the location of the cone front face 21 on the cone 4. The bore probe 106, on the other hand, measures the diameter of the bore 13. In this regard, it should be noted that all bores are slightly out of round. The probe 106 measures both the largest and smallest diameter as well as numerous diameters in between and from this information the computer calculates a so-called best fit circle which is more or less a mean diameter. The cone front face location dimension h will also vary as the cone 4 rotates, and the computer selects a mean value between the two extremes of the reading derived from the axial location probe 104.

The computer thereupon calculates the deviation of the mean cone bore diameter i from the standard or reference for each of the two cones 4. The computer further converts each bore deviation into an equivalent axial dimension by multiplying the deviation by a conversion factor $k$. The two axial dimensions so derived are then added together within the computer.

Figure 7:
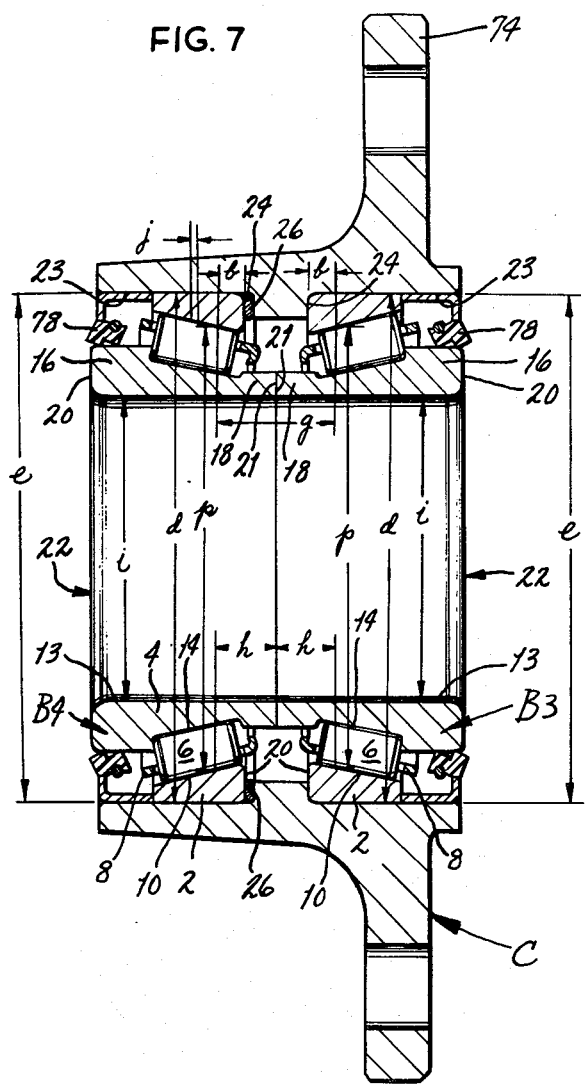
FIG. 7 is an enlarged sectional view of a cup carrier for the driven wheel mounting of FIG. 6 with the bearings being in the cup carrier.

The axial equivalent of the two cone bore deviations is then added to the desired end play since the deviation of the cone bore diameters i from those of the standard will change mounted end play an amount equaling that axial equivalent. The resulting dimension is known as the "compensated desired end play" j (FIG. 7). The computer retains this number in its memory.

In addition to the foregoing calculations, the computer totals the two deviations of the cone front face locations h from the reference values established for those dimensions in each fixture T$a$ and T$b$. From this total the computer subtracts the compensated desired end play, and the value so derived is the desired cup carrier location.

Thereupon, the computer energizes the rams 56 and 64 of the cup pressing fixtures S (FIG. 5), and those rams force the two cups 2 into the end bores 22. The back face 12 of the lower cup 2 will seat against the shoulder 24 at the end of the lower bore 23, while the back face 12 of the upper cup 2 will come against the spacer ring 26. The force exerted by the rams 54 and 64 will increase sufficiently to deform the spacer 26 until its axial dimension spaces the two cups 2 such that the reading derived from the measuring probe 60, which reading reflects the axial spacing between the two tapered measuring plugs 58 and 66, equals the desired cup carrier location. In other words, the incorporation of end play coupled with the variations of the cone assemblies 22 from the master cones 110$a$ and 110$b$ are all such that the cup raceway to raceway location g of the two cups 2 must deviate from the master by an amount equal to the desired cup carrier location. In pressing the cups 2 to the desired cup carrier location, spring back of the spacer 26 is accommodated in the manner previously discussed.

Figure 8:
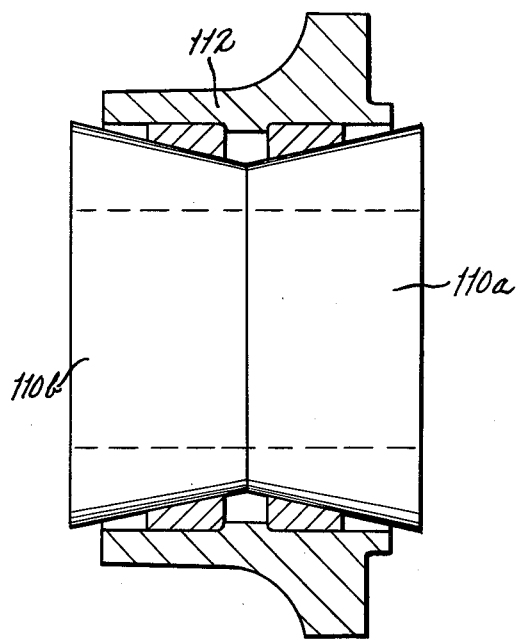
FIG. 8 is a sectional view showing master cups and master cones used for calibration purposes and showing zero clearance between the cones when installed in the cups.

The operation is perhaps better understood by recalling that when the master cones 110$a$ and 110$b$ are fitted into the master cup, zero clearance exists between the front faces of the two master cones 110$a$ and 110$b$ (FIG. 8). That is, the cup carrier stand or location is zero. All measurements thereafter made on the cones 4 and cups 2 for the bearings B3 and B4 merely reflect deviations from the dimensions of the master cones 110$a$ and 110$b$ and the master cup 112. Thus, to provide the desired end play, the two cups 2 must be pressed closer together (FIG. 7). To compensate for an undersized cone bore which will cause the cone raceway 14 to expand more than normal, the cups must also be pressed closer together. On the other hand, if the cone front face locations h are longer than the master cones 110$a$ and 110$b$, they will in effect increase end play so the cups 2 should be pressed together a lesser amount to prevent the end play from becoming excessive.

Once the cups 2 are pressed to their proper position, the cup carrier C is removed from the pressing fixture S and the two cone assemblies 22 are loaded into it, that is, inserted into the cups 2 therein. Thereafter, the assembled cup carrier C is placed within a measuring fixture (not shown) which basically holds the cup carrier C fixed and loads the bearings B3 and B4 in both axial directions with about a 250 lb. force while the cones 4 are rotating. This causes the two cones 4 to undergo axial movement and the movement is the so-called bench end play of the bearing B$a$ and B$b$. This end play should correspond to the compensated desired end play j within close tolerances.

EXAMPLE

The master cup 112 was placed in the cup pressing fixture S and the tapered plugs 58 and 66 were brought against its tapered surfaces. The probe 60 yielded a reading of 0.0000 inches. The master cones 110$a$ and 110$b$ when placed in the master cup 112 contacted the tapered surfaces thereof and zero clearance existed between their front faces. The cup carrier location with the two cones 110$a$ and 110$b$ was therefore 0.0000 inches. The master cone 110a was next placed in the cone measuring fixture T$a$, and the cone bore measured 1.6147 inches, while the cone front face location measured 0.1530 inches. The master cone 110$b$ in the measuring fixture T$b$ yielded the same measurements.

The bearings B3 and B4 were of the same type and nominal size, but of course varied within tolerances. Their cups 2 corresponded to the master cup 112, while their cone assemblies 22 corresponded to master cones 110$a$ and 110$b$. The desired end play, that is, the end play computed from nominal dimensions and with the bearings B3 and B4 removed from the drive flange 82, was selected to be 0.0020 inches. A conversion factor $k$ for the bearing was 1.93.

The cone assembly 22 for the bearing B3 was measured in the measuring fixture T$a$, and those measurements yielded the following:

| | |
|---|---|
| Largest dimension across cone bore | 1.6139" |
| Smallest dimension across cone bore | 1.6135" |
| Mean cone bore | 1.6137" |
| Cone bore deviation | 0.0010" (1.6147"–1.6137") |
| Maximum check on cone front face location | 0.1600" |
| Minimum check on cone front face location | 0.1550" |
| Mean check on cone front face location | 0.1575" |
| Cone front face location variation + | 0.0045" (0.1575"–0.1520") |

Measurement of the cone assembly 22 for the bearing B4 yielded the following:

| | |
|---|---|
| Largest dimension across cone bore | 1.6144" |
| Smallest dimension across cone bore | 1.6140" |
| Mean cone bore | 1.6142" |
| Cone bore variation | 0.0005" (1.6147"–1.6142") |
| Maximum check on cone front face location | 0.1650" |
| Minimum check on cone front face location | 0.1600" |
| Mean check on cone front face location | 0.1625" |
| Cone front face location variation + | 0.0095" (0.1625"–0.1530") |

The two cone bore deviations were multiplied by the conversion factor k to convert them into axial dimensions $$1.93 \times 0.0010 = 0.00193 \text{ inches}$$

$$1.93 \times 0.0005 = 0.00096 \text{ inches}$$

and the two axial dimensions were added together to obtain the axial equivalent of the two cone bore deviations.

$$0.00193 \times 0.00096 = 0.0029 \text{ inches}$$

Since the two cone bores were smaller than the master cones O, upon being press-fitted over the drive flange 82, they will expand more than the master cones 110. This has the effect of creating too much preload. To compensate for this, the cups 2 must be pressed 0.0029 inches closer together, so to speak.

Likewise, to provide the bearing assembly with the end play when assembled, the cups 2 must be pressed still further together. Hence, the axial equivalent of the cone bore deviation is added to the desired end play to provide the compensated desired end play j.

$$0.0029 + 0.0020 = 0.0049 \text{ inches}$$

The two cone front face locations h also affect adjustment, and since they are longer than those of the master cones 110a and 110b, they have the effect of creating excessive end play. To compensate for this, the cups 2 must be moved further apart, so to speak. The deviations in the two cone front face locations are added together.

$$0.0045 + 0.0095 = 0.0140 \text{ inches}$$

Since the deviations in the cone front face location and the compensated desired end play have opposite effects on the bearing adjustment, the latter is substracted from the former to provide the desired cup carrier location.

$$0.0140 - 0.0049 = 0.0091 \text{ inches}$$

Inasmuch as the cone front face location deviation exceeds the compensated desired end play and results in excessive end play, the cups 2 are pressed to a position which is slightly further apart than the master cup 12 and that excessive spacing is the desired cup carrier location of 0.0091 inches.

The reference for the probe 60 is 0.0000 inches, but since the cup raceway to raceway location g should be 0.0091 inches greater than the standard, the probe should read 0.0091 inches when the cups 2 are properly spaced.

The rams 56 and 64 of the pressing fixture S pressed the cups 2 into the cup carrier C until the probe 60 reads 0.0085 inches. The force exerted by the rams 56 and 64 at that time amounted to 28000 lbs. According to the known physical characteristics of the metals for the spacer 26, the cups 2 and the hub H, and according to the relative area in contact and the length of the parts at a force of 25000 lbs. the metal will spring back 0.0006 inches. At that point, the computer released the load on the rams 56 and 64, but the rams 56 and 64 remained generally in place so that the tapered plugs 58 and 66 remained against the cup raceways 10. Upon release of the load, the spacer 22, cups 2 and hub H expanded 0.0006 inches, forcing the cups 2 apart a distance equal to that amount. The probe thereupon provided a reading of 0.0091 inches which is the desired cup carrier location.

Thereafter, the cone assemblies were inserted into the checking fixture and the actual or bench end play was checked. It measured 0.0049 inches which is the compensated desired end play.

Next, the wheel mounting N was completely assembled which included installation of the cones 4 on the drive flange 82. The expansion of the cones 4 as a result of the interference fit reduced the end play by an amount equaling the axial equivalent of the two cone bore deviations, that is, 0.0029 inches, plus the designed amount of shrinkage, that is the amount created by the variation in nominal dimensions.

The foregoing example represents an idealistic situation. Actually, tolerance exist in the diameter of the drive flange 82 which cause the raceways 16 of the cone to shift a distance slightly more or less than the axial equivalent of the two cone bore deviations. Moreover, the measuring probes 60, 104 and 106 themselves have limits which do not always result in precise measurements. In addition, the spring back is not always the same as predicted. Generally speaking, if the cup carrier location as measured by the probe 60 falls within 0.005 inches of the computed desired cup carrier location, the adjustment procedure is terminated.

The process enables wheel mountings to be produced with considerable precision and speed. Normally, the bench end play (measured with the drive flange 82 out the cones 4) comes within 0.001 inches of the compensated desired end play j, while the actual mounted end play (measured with the drive flange 82 in the cones 4) comes within 0.002 inches its design value.

Compensating For Deviations In The Shaft Diameter

In the adjustment of the driven wheel mounting N, the drive flange 82 was assumed to be truly round and a specific or nominal diameter. As a practical matter, tolerances exist in the drive flange diameter and they may be slightly out of round. These deviations from the nominal diameter cause the cones 4 to expand more or less when pressed over the drive flange 82. The tolerances have the same affect as the deviations in the cone bore diameter and are accommodated in the same manner. Thus, a deviation in the shaft diameter is multiplied by a conversion factor k to convert it into an axial equivalent, and twice that axial equivalent is added algebraically to the axial equivalent of the two cone bore deviations. The total axial equivalent is then added algebraically to the desired end play to obtain the compensated desired end play j, and the process is continued in the manner previously discussed. Twice the axial equivalent of the shaft deviation is used since two cones 4 are involved.

Further Considerations

The fixtures S, Ta, and Tb as previously described are utilized with a computer which in effect controls them. It will be recognized that mental steps performed by the computer may be performed by the operator of the fixtures S, Ta, and Tb.

Those adjustment procedures heretofore discussed involving the deformation of a separate spacer 26, may also be achieved by crushing the web located within the housing H or cup carrier C between the two-shoulder 24. In that case, the web is weakened slightly by forming notches therein which open out of one of the shoulders 24. The web then constitutes the spacer.

While the bearing adjustment process disclosed herein has been described in connection with tapered roller bearings, it may also be utilized to adjust angular contact ball bearings. These bearings have the capability of accommodating thrust as well as radial loads since the points of contact for each ball along the raceways of the two rings lie in a line located at an oblique angle with respect to the axis of rotation.

This invention is intended to cover all changes and modifications of the example of the invention herein chosen for purposes of the disclosure which do not constitute departures from the spirit and scope of the invention.

What is claimed is:

1. A process for adjusting a bearing assembly that mounts a shaft within a housing and includes a pair of outer raceways located in the housing and a pair of inner raceways adapted to be fixed in position around the shaft, with each inner raceway being located opposite a different outer raceway, and rolling elements arranged in two rows between opposed inner and outer raceways, the raceways and the rolling elements being configured such that the bearing assembly takes thrust loading in both axial directions as well as radial loading, at least the raceways of one pair being on separate races so that axial positioning of the races relative to each other determines the adjustment of the bearing, said process comprising: placing a deformable spacer between the races on which the raceways of said one pair are located, the spacer being of lesser compressive strength than the races; applying a compressive force to at least one of the races with the force being directed such and being of sufficient magnitude to plastically deform the spacer between the two races, but not the races themselves, whereby the spacing between the racewyas of the two races diminishes, the force being applied while the bearing assembly is disassembled so that the inner raceways are outside of and remote from the outer raceways; and while the force is applied, measuring and monitoring the spacing between the raceways of the two races, the force being applied until the space between the raceways on the two races is such that the bearing assembly, upon being assembled, will have the desired adjustment.

2. The process according to claim 29 wherein both the inner and outer raceways are on races, the races for the outer raceways are separate, and the spacer is between the outer races.

3. The process according to claim 2 wherein an interference fit exists between the outer races and the housing, and the outer races are press-fitted into bores located within the housing.

4. The process according to claim 1 and further comprising measuring the races of the other pair and calculating the distance between the raceways of said one pair from the measurements derived from said other pair.

5. The process according to claim 4 wherein the inner races have bores and are press-fitted over the shaft, whereby raceways thereon are expanded, and the measurement of the said other pair includes measuring the bores of the inner races to determine deviations from nominal dimensions.

6. The process according to claim 4 wherein the inner races have end faces which abut one another and the spacer is located between the outer races.

7. The process according to claim 6 wherein the measuring of said other pair of races includes measuring the location of said end faces on the inner races with respect to the outer surfaces of the rolling elements surrounding the raceways of the inner races when the rolling elements are seated against those raceways.

8. The process according to claim 7 wherein the inner races have bores and are press-fitted over the shaft, and the step of measuring said other pair of races further includes measuring the diameter of the bores in the inner races to determine deviations from nominal dimensions.

9. A process for adjusting a bearing assembly including two tapered roller bearings used to mount a shaft within a housing, each bearing including a cup within the housing and having an inwardly presented tapered raceway, a cone around the shaft and having an outwardly presented tapered raceway, and tapered rollers between the raceways of the cup and cone, the cups of the bearings having back faces which face each other and the cones having front faces which face each other, said process comprising: interposing a deformable spacer between the back faces of the two cups so that the spacing between the raceways on the cups is determined by the thickness of the spacer, the spacer being of lesser strength than the cups; with the cones and tapered rollers removed from the cups, measuring the axial distance between the raceways of the cups such that any changes in the axial distance are detected; and while the axial distance between the raceways of the cups is being monitored, forcing the cups together under an axially applied force of sufficient magnitude to deform the spacer with the force being applied until the axial distance between the raceways of the cups, after release of the axial force, will provide the bearing assembly with the desired adjustment.

10. The process according to claim 9 wherein the step of measuring the distance between the raceways of the cups comprises placing tapered plugs in the cups with the tapered surfaces of the plugs contacting the raceways of the cups, the angle of the taper on the surfaces of the plugs being equal to the angle of the taper on the cup raceways so that face to face contact exists between the tapered surfaces of the plugs and the tapered cup raceways; and measuring the spacing between the plugs.

11. The process according to claim 9 wherein the step of measuring the distance between the raceways of the cups comprises measuring the spacing between the raceways of a master cup and comparing measurements derived from measuring the distance between said cups with the measurement of the master cup.

12. The process according to claim 11 wherein the force is applied to the cups until the spacing between the cups is slightly less than that required to provide the desired adjustment so that when the force is released the spacer will spring back and increase the spacing between the raceways of the cups to a value which provides the bearing assembly with the desired adjustment.

13. The process according to claim 12 and further comprising monitoring the force applied to the cups as the distance between the cup raceways is measured and monitored, comparing that force with the spring back characteristics of the spacer, and releasing the force when the magnitude of the spring back corresponding to the force approximately equals the difference between the desired spacing between the cup raceways and the actual spacing with the force applied so that when the force is released the spacer will spring back by an amount equalling the difference and the desired spacing will exist between the raceways of the cup.

14. The process according to claim 11 wherein the front faces of the cone abut, and further comprising measuring the location of the front face of each cone with respect to the outer surfaces of the tapered rollers surrounding the tapered raceway of that cone when the rollers are seated against the tapered raceway of that cone, and altering the desired spacing between the cup raceways to compensate for deviations of the cone front faces from a standard position therefor.

15. The process according to claim 14 wherein the step of measuring the location of each cone front face comprises placing the cone and rollers in a work cup, causing relative rotation between the cone and work cup while applying an axial force to the cone in the direction which seats the tapered rollers thereof against the work cup and the cone raceway, and measuring the location of the cone front face with respect to the work cup.

16. The process according to claim 15 wherein the step of measuring the axial location of each cone front face further comprises placing a master cone in the work cup, the master cone having a front face which locates at a known position when the master cone is placed in the master cup, measuring the location of the front face for the master cone with respect to the work cup, and comparing the measurements derived from the cone with those derived from the master cone to determine a deviation in cone front face location.

17. The process according to claim 16 wherein the axial spacing between the cup raceway is adjusted relative to the spacing between the raceways of the master cup by an amount reflecting the deviation in the location of the cone front faces.

18. The process according to claim 12 wherein the axial spacing between the cup raceways is further adjusted by a predetermined amount sufficient to provide the bearing assembly with a predetermined amount of end play.

19. The process according to claim 14 wherein an interference fit exists between the cones and the shaft and the cones are pressed over the shaft, and further comprising measuring the diameter of the bore in each cone, and altering the spacing between the cup raceways to compensate for the changes in the cone raceway positions which will occur when the cone is pressed over the shaft as a result of deviations of the cone bore diameter from a nominal value.

20. The process according to claim 19 wherein the step of measuring the bore of each cone comprises measuring the diameter of a bore in a master cone and comparing the measurement derived from the master cone with the measurement derived from the cone to obtain a deviation, converting that deviation into an axial equivalent, and adjusting the axial distance between the cup raceways relative to the axial distance between the raceways of the master cup by an amount reflecting the axial equivalent of the deviation.

21. The process according to claim 1 wherein the step of measuring and monitoring the spacing between the raceways of the two races comprises bringing a separate contact element into contact with the raceway on each race and measuring the spacing between the contact elements.

22. The process according to claim 1 wherein the raceways of the other pair are also located on separate races which when installed in the bearing assembly locate in a predetermined position with respect to each other.

23. The process according to claim 22 wherein said other pair of races have the inner raceway on them and the inner races have front faces which are presented opposite to each other when the inner races are installed in the bearing assembly, and further comprising inserting each inner race and the rolling elements that are assocated with it into a fixture having a reference raceway therein, and measuring the location of the front face with respect to the fixture.

* * * * *